United States Patent
Hong et al.

(10) Patent No.: US 9,217,878 B2
(45) Date of Patent: Dec. 22, 2015

(54) LIGHT SWITCHING MODULE

(71) Applicant: BENQ MATERIALS CORPORATION, Taoyuan County (TW)

(72) Inventors: Cyun-Tai Hong, New Taipei (TW); Lung-Hai Wu, Taoyuan (TW); Fung-Hsu Wu, Taoyuan County (TW); Chen-Kuan Kuo, New Taipei (TW)

(73) Assignee: Benq Materials Corporation, Taoyuan County (TW)

( * ) Notice: Subject to any disclaimer, the term of this patent is extended or adjusted under 35 U.S.C. 154(b) by 0 days.

(21) Appl. No.: 14/584,178

(22) Filed: Dec. 29, 2014

(65) Prior Publication Data
US 2015/0219915 A1    Aug. 6, 2015

(30) Foreign Application Priority Data
Feb. 6, 2014    (TW) .............................. 103103910 A

(51) Int. Cl.
  *G02B 27/28*    (2006.01)
  *G02B 5/02*    (2006.01)
(52) U.S. Cl.
  CPC ............ *G02B 27/281* (2013.01); *G02B 5/0231* (2013.01)
(58) Field of Classification Search
  CPC ............................ G02B 27/281; G02B 5/0231
  USPC ............................. 359/485.05, 487.03, 489.07
  See application file for complete search history.

(56) References Cited

U.S. PATENT DOCUMENTS

| | | | | |
|---|---|---|---|---|
| 6,046,849 A * | 4/2000 | Moseley | ............... | G02B 5/3016 348/57 |
| 6,055,103 A * | 4/2000 | Woodgate | ............ | G02B 5/3016 348/E13.022 |
| 6,734,936 B1 * | 5/2004 | Schadt | .................... | G02B 5/30 349/117 |
| 6,735,017 B1 * | 5/2004 | Acosta | ................. | G02B 5/3083 348/E13.038 |
| 8,743,188 B2 * | 6/2014 | Kim | .................... | H04N 13/0422 348/42 |
| 2004/0240777 A1 * | 12/2004 | Woodgate | .......... | G02B 27/2214 385/16 |
| 2005/0285997 A1 * | 12/2005 | Koyama | ............. | H04N 13/0454 349/117 |
| 2008/0198456 A1 * | 8/2008 | Sharp | ................... | G02B 27/288 359/489.07 |
| 2012/0169950 A1 * | 7/2012 | Tatzel | ................. | G02B 5/3083 349/18 |
| 2013/0170034 A1 * | 7/2013 | Merrill | ................ | G02B 5/3083 359/486.01 |
| 2014/0198384 A1 * | 7/2014 | Amimori | ............... | B60K 35/00 359/486.01 |

* cited by examiner

*Primary Examiner* — Frank Font
(74) *Attorney, Agent, or Firm* — Muncy, Geissler, Olds & Lowe, P.C.

(57) ABSTRACT

Disclosed is a light switching module comprising a polarizing element with a patterned retarder having a variable first optical axis; a retardation element having a variable second optical axis and a scattering microstructure; and a shifting means for adjusting the relative position of the polarizing element and the retardation element to switch the light switching module to transparent state or scattering state.

16 Claims, 8 Drawing Sheets

LIGHT SWITCHING MODULE

CROSS-REFERENCE TO RELATED APPLICATION

This application claims the benefit of Taiwan Patent Application No. 103103910, filed on Feb. 6, 2014, in the Taiwan Intellectual Property Office, the disclosure of which is incorporated herein in its entirety by reference.

BACKGROUND

1. Technical Field

The present invention relates to a light switching module for switching the state of the incident light to transparent state or scattering state according to the principle of light refraction.

2. Description of Related Art

With the developments of the smart glass and smart window, various applications of light adjusting device or light switching device are thereby on the increase. The technical principle of conventional electronically controlled liquid crystal type smart windows is to sandwich polymer-dispersed liquid crystals between two sheets of glass, and to control the alignment directions of the liquid crystals of ordered or disordered arrangement with electric field for adjusting the transmittance. The polymer-dispersed liquid crystals are liquid crystal droplets dispersed into a polymer matrix and aligned in a continuous power supply to maintain a transparent state; however, it usually has some problems of uneven dispersion of the liquid crystals, and power consumption under continuous power supply.

SUMMARY OF THE INVENTION

Accordingly, the present disclosure is to provide a novel, inventive and useful light switching module for switching the transmitting light to transparent state or scattering state.

An aspect of the present disclosure is to provide a light switching module comprising a polarizing element comprising a polarizer with an absorption axis; and a first patterned retarder on an opposite side to the polarizer with respect to the side of incident light, wherein the first patterned retarder has a first optical axis configured to be variable in direction; a retardation element having a second optical axis configured to be variable in direction comprising a substrate with a refractive index comprising a plurality of scattering microstructures on a side thereof; a birefringent layer disposed on the plurality of scattering microstructures of the substrate; the birefringent layer having an extraordinary refractive index ($n_e$) parallel to the long-axis of the birefringent layer and an ordinary refractive index ($n_o$) parallel to the short-axis of the birefringent layer; and a second patterned retarder adjacent to the first patterned retarder; wherein the polarizing element is disposed adjacent to the retardation element; the polarizing element is on the side of incident light; the retardation element is on the side of emitted light, and the refractive index of the substrate is the same as one of the extraordinary refractive index and the ordinary refractive index of the birefringent layer; and a shifting means connected to the polarizing element or the retardation element for adjusting the relative position of the polarizing element and the retardation element to switch the light switching module to transparent state or scattering state.

In a light switching module of a preferred embodiment of the present invention, the first optical axis of the first patterned retarder is variable in continuous, discontinuous or continuous and discontinuous direction.

In a light switching module of another preferred embodiment of the present invention, the second optical axis of the retardation element is variable in continuous, discontinuous or continuous and discontinuous direction.

In a light switching module of another preferred embodiment of the present invention, the first optical axis of the first patterned retarder and the second optical axis of the retardation element are arranged in one of the forms of curves, polylines, straight lines or a combination thereof.

In a light switching module of another preferred embodiment of the present invention, the retardation of the first patterned retarder and the retardation element are $\pm\lambda/4$, and the variable first optical axis is in angles of 45 degrees and 135 degrees to the direction of the absorption axis of the polarizer.

In a light switching module of another preferred embodiment of the present invention, the retardation of the first patterned retarder and the retardation element are $\pm\lambda/2$.

In a light switching module of another preferred embodiment of the present invention, the plurality of scattering microstructures are arranged in one-dimension or two-dimension.

In a light switching module of another preferred embodiment of the present invention, the plurality of scattering microstructures include concave-convex microstructures.

In a light switching module of another preferred embodiment of the present invention, the plurality of scattering microstructures are selected from the group consisting of spherical micro lenses, aspherical micro lenses, micro prisms, rough surface structures and a combination thereof.

In a light switching module of another preferred embodiment of the present invention, the cross-sectional shape of the scattering microstructures is selected from the group consisting of polygons, semi-circular, semi-elliptical, irregular shape and a combination thereof.

In a light switching module of another preferred embodiment of the present invention, the pitch of the scattering microstructures is in a range of 0 µm to 1000 µm; the width of each of the scattering microstructures is in a range of 10 µm to 1000 µm; the height of each of the scattering microstructures is in a range of 10 µm to 1000 µm.

In a light switching module of another preferred embodiment of the present invention, the material of the birefringent layer is liquid crystal, birefringent crystal or birefringent resin.

In a light switching module of another preferred embodiment of the present invention, the polarizing element is selected from the group consisting of an absorption-type polarizer, a reflection-type polarizer, a dyeing-type polarizer, a coatable polarizer, a wire-grid polarizer and a combination thereof.

Another aspect of the present disclosure is to provide a light switching module comprising a polarizing element comprising a polarizer with an absorption axis; and a first patterned retarder on an opposite side to the polarizer with respect to the side of incident light, wherein the first patterned retarder has a first optical axis configured to be variable in direction; and a retardation element having a second optical axis configured to be variable in direction comprising a substrate with a refractive index comprising a plurality of scattering microstructures on a side thereof; a birefringent layer disposed on the plurality of scattering microstructures of the substrate; the birefringent layer having an extraordinary refractive index ($n_e$) parallel to the long-axis of the birefringent layer and an ordinary refractive index ($n_o$) parallel to the short-axis of the birefringent layer; and a patterned retardation microstructure layer between the birefringent layer and the plurality of scattering microstructures configured to be variable in alignment direction; wherein the polarizing element is disposed adjacent to the retardation element, and the retardation element is on the side of emitted light, and the refractive index of the substrate is the same as one of the extraordinary refractive index and the ordinary refractive index of the birefringent layer; and a shifting means connected to the polarizing element or the retardation element for adjusting the relative position of the polarizing element and the retardation element to change the scattering state of the light switching module.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DESCRIPTION OF EMBODIMENTS OF THE INVENTION

To describe the technical features of the present invention in greater detail, preferred embodiments of the present invention are provided below along with the accompanied drawings accordingly as follows. The various embodiments will be described in detail with reference to the accompanying drawings. References made to particular examples and implementations are for illustrative purposes, and are not intended to limit the scope of the invention or the claims.

The light switching module of the present invention will be described along with the accompanied drawings accordingly as follows. It is appreciated that the same reference numbers will be used throughout the drawings to refer to the same or like parts.

Figure 1:
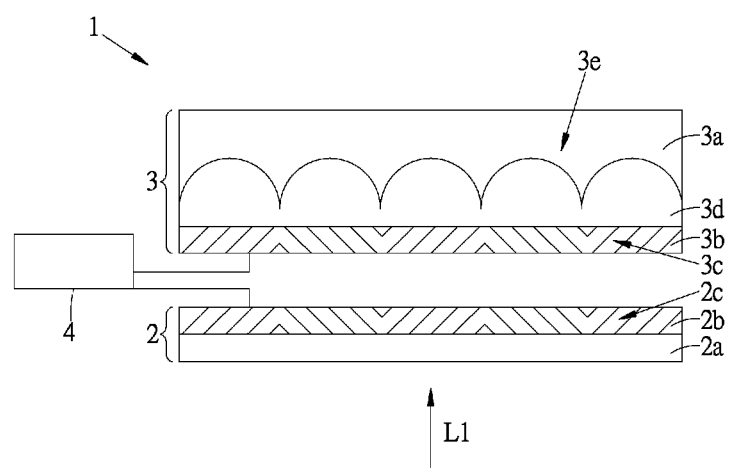
FIG. 1 is a perspective view of the light switching module of an aspect of the present invention.

Referring to FIG. 1, an aspect of the present disclosure is to provide a light switching module 1 comprising a polarizing element 2 comprising a polarizer 2a with an absorption axis for transferring the incident light L1 to polarized light; and a first patterned retarder 2b on an opposite side to the polarizer 2a with respect to the side of incident light L1, wherein the first patterned retarder 2b has a first optical axis 2c configured to be variable in direction; a retardation element 3 having a second optical axis 3c configured to be variable in direction comprising a substrate 3a with a refractive index comprising a plurality of scattering microstructures 3e on a side thereof; a birefringent layer 3d disposed on the plurality of scattering microstructures 3e of the substrate 3a; the birefringent layer 3d having an extraordinary refractive index ($n_e$) parallel to the long-axis of the birefringent layer 3d and an ordinary refractive index ($n_o$) parallel to the short-axis of the birefringent layer 3d; and a second patterned retarder 3b adjacent to the first patterned retarder 2b; wherein the polarizing element 2 is disposed adjacent to the retardation element 3; the polarizing element 2 is on the side of incident light L1; the retardation element 3 is on the side of emitted light, and the refractive index of the substrate 3a is the same as one of the extraordinary refractive index and the ordinary refractive index of the birefringent layer 3d; and a shifting means 4 connected to the polarizing element 2 or the retardation element 3 for adjusting the relative position of the polarizing element 2 and the retardation element 3 to switch the light switching module 1 to transparent state or scattering state.

In a light switching module of a preferred embodiment of the present invention, the first optical axis of the first patterned retarder is variable in continuous, discontinuous or continuous and discontinuous direction; the second optical axis of the retardation element is also variable in continuous, discontinuous or continuous and discontinuous direction; accordingly, the light switching module makes a direct conversion or gradual change.

In a light switching module of another preferred embodiment of the present invention, the first optical axis of the first patterned retarder and the second optical axis of the retardation element are arranged in one of the forms of curves, polylines, straight lines or a combination thereof.

Figure 2A:
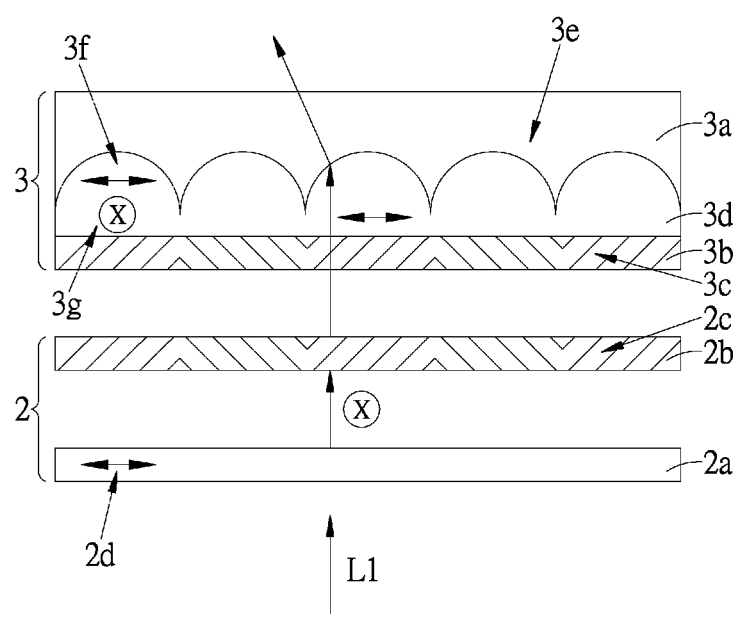
FIGS. 2a and 2b are perspective views illustrating the optical path of the light switching module of an embodiment of the present invention.
Figure 2B:
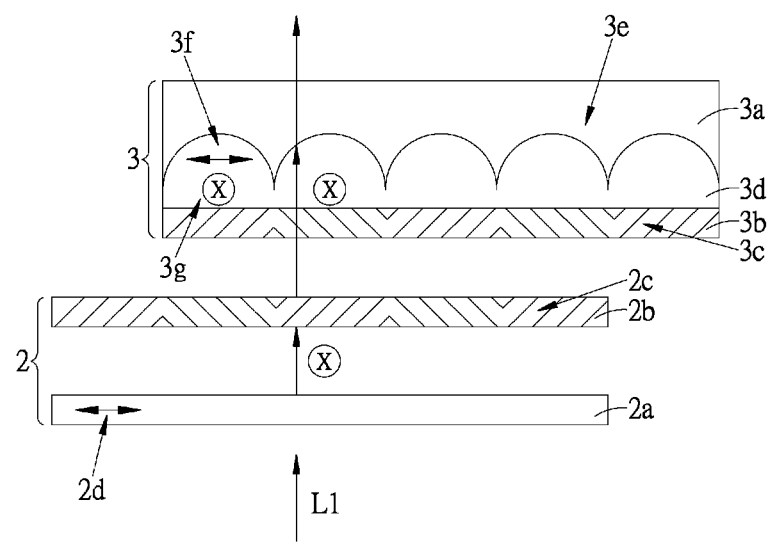
Figure 3A:
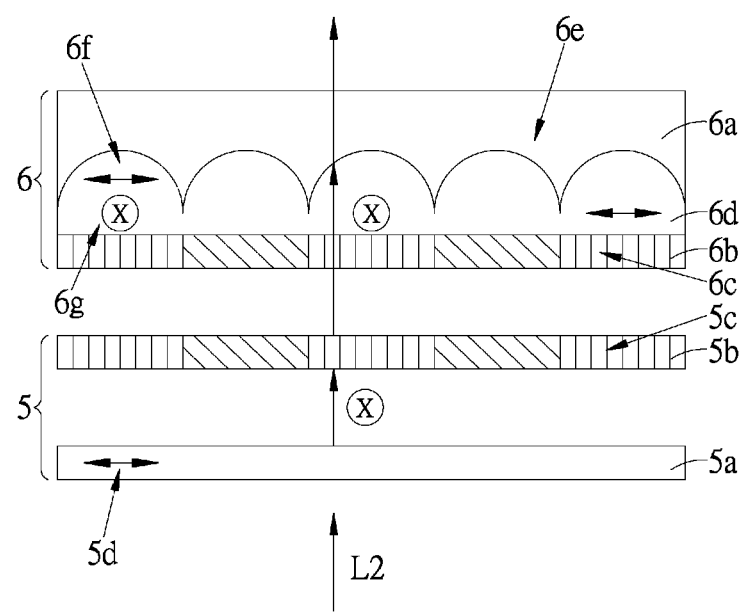
FIGS. 3a and 3b are perspective views illustrating the optical path of the light switching module of another embodiment of the present invention.
Figure 3B:
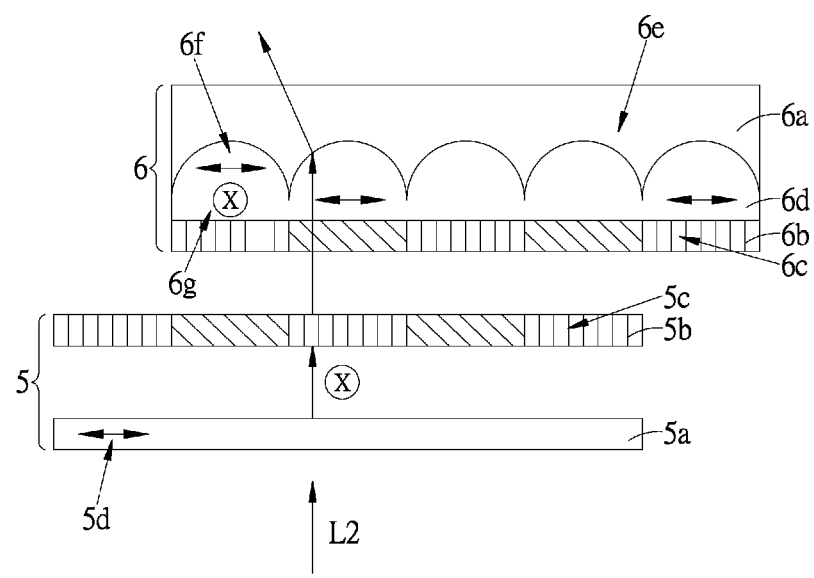

Referring to FIGS. 2a and 2b, in a light switching module of another preferred embodiment of the present invention, the retardation of the first patterned retarder 2b of polarizing element 2 and the retardation element 3 are ±λ/4; the variable first optical axis 2c is in angles of 45 degrees and 135 degrees to the direction of the absorption axis 2d of the polarizer 2a; the first optical axis 2c of the first patterned retarder 2b and the corresponding second optical axis 3c of the second patterned retarder 3b are parallel to each other; the incident light L1 passes through the absorption axis 2d and transforms to a polarized light perpendicular to the direction of the absorption axis 2d; the polarized light passes through the first patterned retarder 2b and the second patterned retarder 3b and then transforming to the polarized light parallel to the direction of the long-axis 3f of the birefringent layer 3d; in a condition of that the refractive index of the substrate 3a and ordinary refractive index of the birefringent layer 3d are the same, the polarized light parallel to the direction of the long-axis 3f of the birefringent layer 3d can induce the extraordinary refractive index of the birefringent layer 3d; therefore, the substrate 3a and the birefringent layer 3d are different media to the incident light L1, and occur refraction phenomenon at the interface; accordingly, the incident light L1 cannot directly pass through the plurality of scattering microstructures 3e of the retardation element 3, and forms a scattering state; when use a shifting means to adjust the relative position of the polarizing element 2 and the retardation element 3, and the first optical axis 2c of the first patterned retarder 2b and the corresponding second optical axis 3c of the second patterned retarder 3b are perpendicular to each other, the incident light L1 passes through the absorption axis 2d and transforms to a polarized light perpendicular to the direction of the absorption axis 2d; the polarized light passes through the first patterned retarder 2b and the second patterned retarder 3b and then transforming to the polarized light parallel to the direction of the short-axis 3g of the birefringent layer 3d; the polarized light parallel to the direction of the short-axis 3g of the birefringent layer 3d can induce the ordinary refractive index of the birefringent layer 3d, and therefore, the substrate 3a and the birefringent layer 3d are the same media to the incident light L1, and do not occur refraction phenomenon at the interface; accordingly, the incident light L1 can directly pass through the plurality of scattering microstructures 3e of the retardation element 3, and forms a transparent state;

Referring to FIGS. 3a and 3b, in a light switching module of another preferred embodiment of the present invention, the retardation of the first patterned retarder 5b of the polarizing element 5 and the retardation element 6 are $\pm\lambda/2$; the variable first optical axis 5c is in angles of 45 degrees and 90 degrees to the direction of the absorption axis 5d of the polarizer 5a; the first optical axis 5c of the first patterned retarder 5b and the corresponding second optical axis 6c of the second patterned retarder 6b are parallel to each other; the incident light L2 passes through the absorption axis 5d and transforms to a polarized light perpendicular to the direction of the absorption axis 5d; the polarized light passes through the first patterned retarder 5b and the second patterned retarder 6b and then transforming to the polarized light parallel to the direction of the short-axis 6g of the birefringent layer 6d; in a condition of that the refractive index of the substrate 6a and ordinary refractive index of the birefringent layer 6d are the same, the polarized light parallel to the direction of the short-axis 6g of the birefringent layer 6d can induce the ordinary refractive index of the birefringent layer 6d; therefore, the substrate 6a and the birefringent layer 6d are the same media to the incident light L2, and do not occur refraction phenomenon at the interface; accordingly, the incident light L2 can directly pass through the plurality of scattering microstructures 6e of the retardation element 6, and forms a transparent state; when use a shifting means to adjust the relative position of the polarizing element 5 and the retardation element 6, and the first optical axis 5c of the first patterned retarder 5b are all in an angle of 45 degrees to the direction of the corresponding second optical axis 6c of the second patterned retarder 6b, the incident light L2 passes through the absorption axis 5d and transforms to a polarized light perpendicular to the direction of the absorption axis 5d; the polarized light passes through the first patterned retarder 5b and the second patterned retarder 6b and then transforming to the polarized light parallel to the direction of the long-axis 6f of the birefringent layer 6d; the polarized light parallel to the direction of the long-axis 6f of the birefringent layer 6d can induce the extraordinary refractive index of the birefringent layer 6d, and therefore, the substrate 6a and the birefringent layer 6d are different media to the incident light L2, and occur refraction phenomenon at the interface; accordingly, the incident light L2 cannot directly pass through the plurality of scattering microstructures 6e of the retardation element 6, and forms a scattering state.

In a light switching module of another preferred embodiment of the present invention, the plurality of scattering microstructures are arranged in one-dimension or two-dimension, and the plurality of scattering microstructures include concave-convex microstructures for enhancing the effect and uniformity of the scattering state of the light switching module with incident light in different directions.

In a light switching module of another preferred embodiment of the present invention, the plurality of scattering microstructures are selected from the group consisting of spherical micro lenses, aspherical micro lenses, micro prisms, rough surface structures and a combination thereof.

Figure 4:
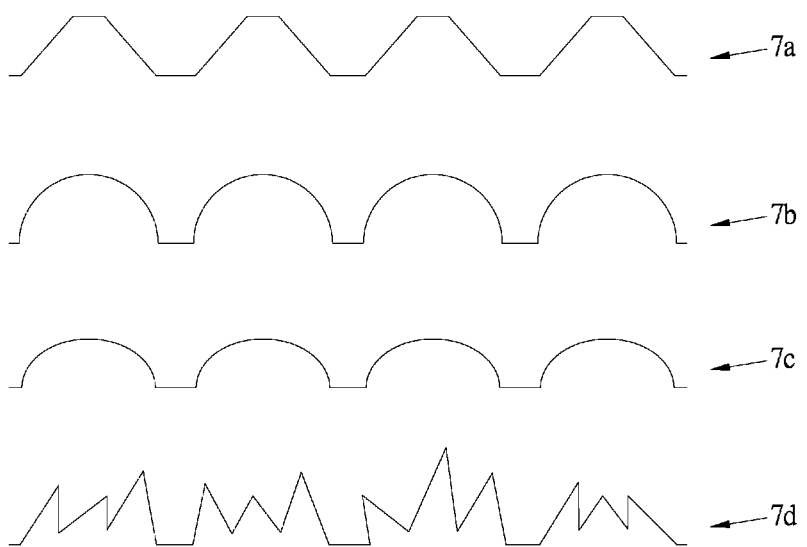
FIG. 4 is a perspective view illustrating different cross-sectional shapes of the scattering microstructures of the light switching module of another embodiment of the present invention.

Referring to FIG. 4, in a light switching module of another preferred embodiment of the present invention, the cross-sectional shape of the scattering microstructures is selected from the group consisting of polygons 7a, semi-circular 7b, semi-elliptical 7c, irregular shape 7d and a combination thereof.

Figure 5:
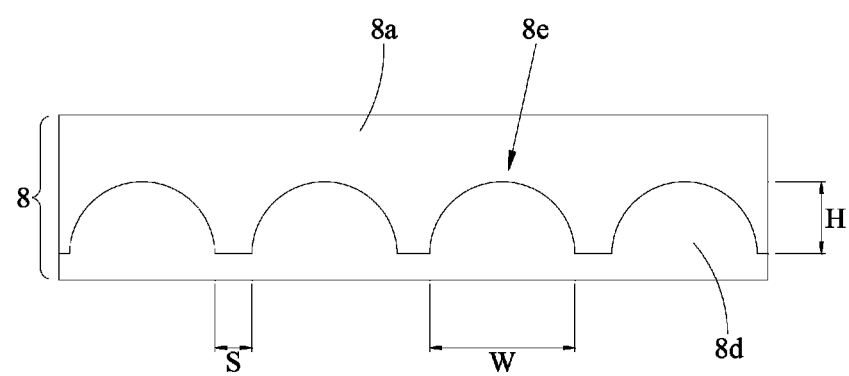
FIG. 5 is a perspective view of the retardation element of the light switching module of another embodiment of the present invention.

Referring to FIG. 5, in a retardation element 8 of a light switching module of another preferred embodiment of the present invention, the pitch S of the scattering microstructures 8e between the substrate 8a and the birefringent layer 8d is in a range of 0 μm to 1000 μm; the width W of each of the scattering microstructures 8e is in a range of 10 μm to 1000 μm; the height H of each of the scattering microstructures 8e is in a range of 10 μm to 1000 μm.

In a light switching module of another preferred embodiment of the present invention, the material of the birefringent layer is liquid crystal, birefringent crystal or birefringent resin.

In a light switching module of another preferred embodiment of the present invention, the polarizing element is selected from the group consisting of an absorption-type polarizer, a reflection-type polarizer, a dyeing-type polarizer, a coatable polarizer, a wire-grid polarizer and a combination thereof.

Figure 6:
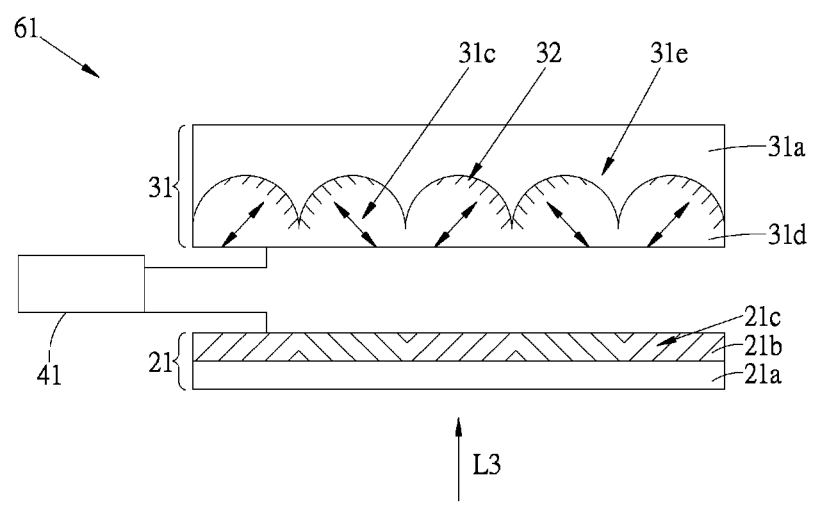
FIG. 6 is a perspective view of the light switching module of another aspect of the present invention.

Referring to FIG. 6, another aspect of the present disclosure is to provide a light switching module 61 comprising a polarizing element 21 comprising a polarizer 21a with an absorption axis for transforming the incident light L3 to polarized light; and a first patterned retarder 21b on an opposite side to the polarizer 21a with respect to the side of incident light L3, wherein the first patterned retarder 21b has a first optical axis 21c configured to be variable in direction; and a retardation element 31 having a second optical axis 31c configured to be variable in direction comprising a substrate 31a with a refractive index comprising a plurality of scattering microstructures 31e on a side thereof; a birefringent layer 31d disposed on the plurality of scattering microstructures 31e of the substrate 31a, the birefringent layer 31d having an extraordinary refractive index ($n_e$) parallel to the long-axis of the birefringent layer 31d and an ordinary refractive index ($n_o$) parallel to the short-axis of the birefringent layer 31d; and a patterned retardation microstructure layer 32 between the birefringent layer 31d and the plurality of scattering microstructures 31e configured to be variable in alignment direction; wherein the polarizing element 21 is disposed adjacent to the retardation element 31, and the retardation element 31 is on the side of emitted light, and the refractive index of the substrate 31a is the same as one of the extraordinary refractive index and the ordinary refractive index of the birefringent layer 31d; and a shifting means 41 connected to the polarizing element 21 or the retardation element 31 for adjusting the relative position of the polarizing element 21 and the retardation element 31 to switch the light switching module 61 to transparent state or scattering state.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A light switching module comprising:
a polarizing element comprising
a polarizer with an absorption axis; and
a first patterned retarder on an opposite side to the polarizer with respect to the side of incident light, wherein the first patterned retarder has a first optical axis configured to be variable in direction;
a retardation element having a second optical axis configured to be variable in direction comprising
a substrate with a refractive index comprising a plurality of scattering microstructures on a side thereof;
a birefringent layer disposed on the plurality of scattering microstructures of the substrate; the birefringent layer having an extraordinary refractive index parallel to the long-axis of the birefringent layer and an ordinary refractive index parallel to the short-axis of the birefringent layer; and
a second patterned retarder adjacent to the first patterned retarder;
wherein the polarizing element is disposed adjacent to the retardation element; the polarizing element is on the side of incident light; the retardation element is on the side of emitted light, and the refractive index of the substrate is the same as one of the extraordinary refractive index and the ordinary refractive index of the birefringent layer; and
a shifting means connected to the polarizing element or the retardation element for adjusting the relative position of the polarizing element and the retardation element to switch the light switching module to transparent state or scattering state.

2. The light switching module according to claim 1, wherein the first optical axis of the first patterned retarder is variable in continuous, discontinuous or continuous and discontinuous direction.

3. The light switching module according to claim 1, wherein the second optical axis of the retardation element is variable in continuous, discontinuous or continuous and discontinuous direction.

4. The light switching module according to claim 1, wherein the first optical axis of the first patterned retarder and the second optical axis of the retardation element are arranged in one of the forms of curves, polylines, straight lines or a combination thereof.

5. The light switching module according to claim 1, wherein the retardation of the first patterned retarder and the retardation element are ±λ/4, and the variable first optical axis is in an angle of 45 degrees or 135 degrees to the direction of the absorption axis of the polarizer.

6. The light switching module according to claim 1, wherein the retardation of the first patterned retarder and the retardation element are ±λ/2.

7. The light switching module according to claim 1, wherein the plurality of scattering microstructures are arranged in one-dimension or two-dimension.

8. The light switching module according to claim 1, wherein the plurality of scattering microstructures include concave-convex microstructures.

9. The light switching module according to claim 1, wherein the plurality of scattering microstructures are selected from the group consisting of spherical micro lenses, aspherical micro lenses, micro prisms, rough surface structures and a combination thereof.

10. The light switching module according to claim 1, wherein the cross-sectional shape of the scattering microstructures is selected from the group consisting of polygons, semi-circular, semi-elliptical, irregular shape and a combination thereof.

11. The light switching module according to claim 1, wherein the pitch of the scattering microstructures is in a range of 0 μm to 1000 μm.

12. The light switching module according to claim 1, wherein the width of each of the scattering microstructures is in a range of 10 μm to 1000 μm.

13. The light switching module according to claim 1, wherein the height of each of the scattering microstructures is in a range of 10 μm to 1000 μm.

14. The light switching module according to claim 1, wherein the material of the birefringent layer is liquid crystal, birefringent crystal or birefringent resin.

15. The light switching module according to claim 1, wherein the polarizing element is selected from the group consisting of an absorption-type polarizer, a reflection-type polarizer, a dyeing-type polarizer, a coatable polarizer, a wire-grid polarizer and a combination thereof.

16. A light switching module comprising:
a polarizing element comprising
a polarizer with an absorption axis; and
a first patterned retarder on an opposite side to the polarizer with respect to the side of incident light, wherein the first patterned retarder has a first optical axis configured to be variable in direction; and
a retardation element having a second optical axis configured to be variable in direction comprising
a substrate with a refractive index comprising a plurality of scattering microstructures on a side thereof;
a birefringent layer disposed on the plurality of scattering microstructures of the substrate; the birefringent layer having an extraordinary refractive index parallel to the long-axis of the birefringent layer and an ordinary refractive index parallel to the short-axis of the birefringent layer; and
a patterned retardation microstructure layer between the birefringent layer and the plurality of scattering microstructures configured to be variable in alignment direction;
wherein the polarizing element is disposed adjacent to the retardation element, and the retardation element is on the side of emitted light, and the refractive index of the substrate is the same as one of the extraordinary refractive index and the ordinary refractive index of the birefringent layer; and
a shifting means connected to the polarizing element or the retardation element for adjusting the relative position of the polarizing element and the retardation element to change the scattering state of the light switching module.

* * * * *